United States Patent [19]

Bishop et al.

[11] Patent Number: 5,058,497

[45] Date of Patent: Oct. 22, 1991

[54] COMPLIANT PRESSURE ROLLER

[75] Inventors: James C. Bishop, Columbia; Richard E. Sharp, Hazelwood, both of Mo.

[73] Assignee: McDonnell Douglas Corporation, St. Louis, Mo.

[21] Appl. No.: 628,472

[22] Filed: Dec. 17, 1990

[51] Int. Cl.⁵ .............................................. B30B 3/00
[52] U.S. Cl. .................... 100/155 R; 29/125; 100/210; 156/582
[58] Field of Search .............. 100/155 R, 210, 153, 100/168, 170; 29/125, 113.1, 113.2; 156/411, 412, 582

[56] References Cited

U.S. PATENT DOCUMENTS

| | | | |
|---|---|---|---|
| 4,052,246 | 10/1977 | Albareda et al. | 156/412 |
| 4,341,584 | 7/1982 | Czernichowsky | 156/412 |
| 4,869,774 | 9/1989 | Wisbey | 100/210 X |
| 4,954,204 | 9/1990 | Grimshaw | 156/411 X |

FOREIGN PATENT DOCUMENTS

| | | | |
|---|---|---|---|
| 2753272 | 5/1979 | Fed. Rep. of Germany | 156/412 |
| 2806973 | 8/1979 | Fed. Rep. of Germany | 156/412 |

Primary Examiner—Harvey C. Hornsby
Assistant Examiner—Stephen F. Gerrity
Attorney, Agent, or Firm—Timothy H. Courson; Guy R. Gosnell; Benjamin Hudson, Jr.

[57] ABSTRACT

A compact roller system including a housing for a plurality of disks, each independently supported within a support member having sides which partially envelop the external peripheries of the disk. The disks do not separate or dislodge from their corresponding support members, yet the disks are capable of rotating within their corresponding support members. Each disk/support member shifts radially within the housing to accommodate the varying contours of a workpiece surface. The disks, in combination with their corresponding support members, apply an adjustable, evenly distributed compaction force to the workpiece surface through internal pressurization of the housing with a compressed gas.

4 Claims, 2 Drawing Sheets

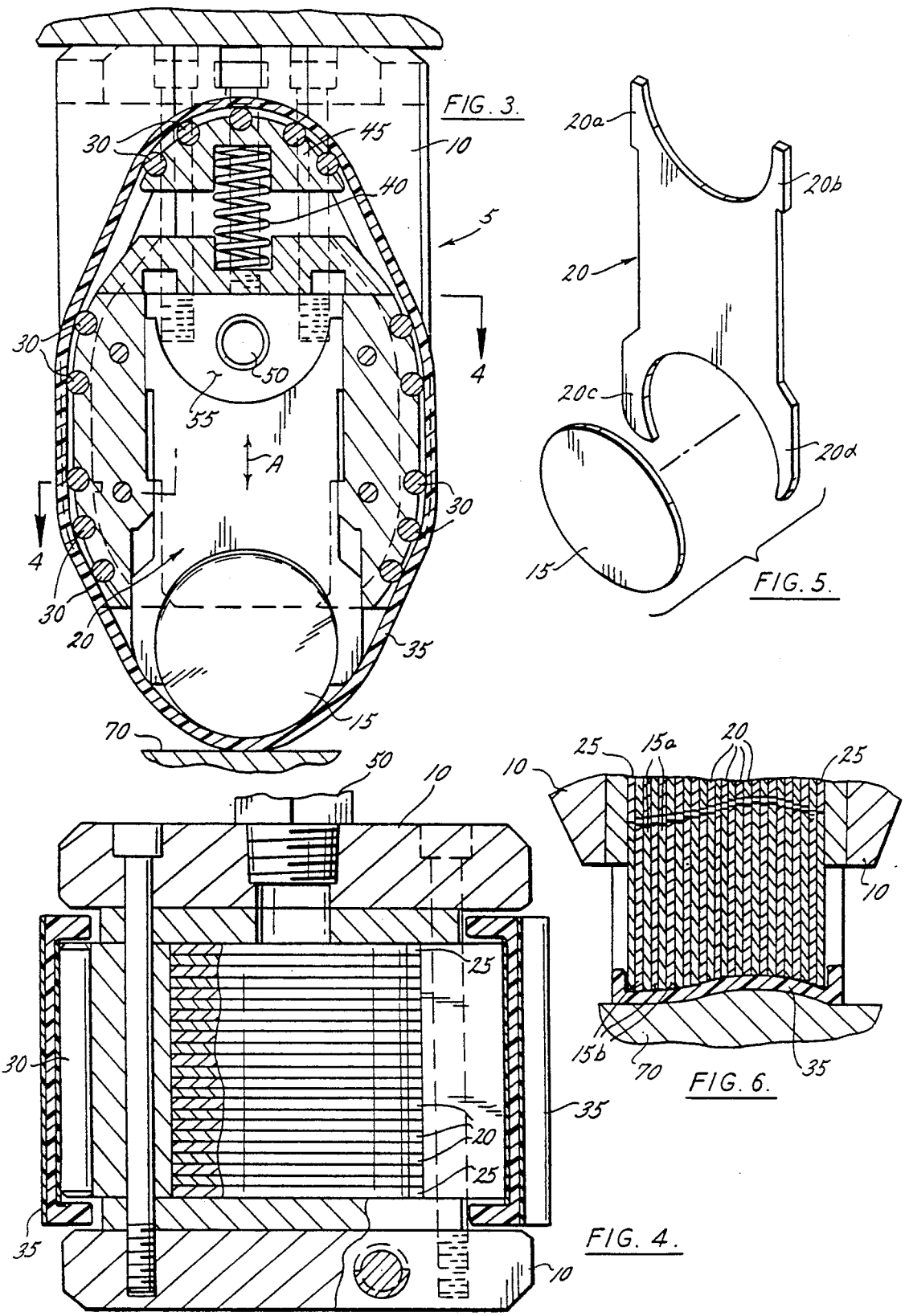

COMPLIANT PRESSURE ROLLER

BACKGROUND OF THE INVENTION

1. Field of the Invention

The present invention generally relates to compaction devices and, more particularly, is concerned with an apparatus for applying an even and adjustable compaction force across a continuously varying contour surface.

2. Description of the Prior Art

The compaction of composite materials, as needed in fiber placement processes, requires a uniform application of pressure at the process zone. Previous compaction implements for this particular purpose have employed cylindrical rollers of solid construction. Because these rollers have little or no compliancy, such arrangements result in poor compaction of the workpiece.

Other compaction devices for smoothing the surface area of a material, such as the one disclosed in U.S. Pat. No. 3,192,838 which issued on July 6, 1965, to A. G. Cook et al, typically include rollers or roller disks which can move independently to accommodate different thickness portions of a workpiece material. However, such prior art devices generally require an internal shaft or the like to support the rollers; furthermore, the radially shifting movement of the rollers in these devices usually requires spring mechanisms.

SUMMARY OF THE INVENTION

The present invention solves problems associated with prior art compaction devices and applies an even, adjustable compaction force across all portions of a continuously varying contour surface without employing internal shafts or axles for the roller means and without requiring spring mechanisms to radially shift the roller means. Furthermore, the disclosed compaction device is able to withstand high temperatures necessary for processing thermoplastic composites, typically over 700° F.

The compact, internally cooled roller system of the present invention includes a housing for a plurality of separate, adjacent disks, each independently supported within a support member having sides which partially envelop the external peripheries of the disk. Although the disks do not separate or dislodge from their corresponding support members, they are capable of rotating or turning freely within the corresponding support member. Each disk/support member is also capable of shifting radially within the housing in response to the irregular contours of the workpiece surface.

In operation, an adjustable source of pressurized gas applies a downward force to the disks and their corresponding support members. As the roller system is rolled across the workpiece surface, each disk/support member is verically displaced within the housing in response to the contours of the workpiece surface. As such, the roller system applies an adjustable, evenly distributed compaction force across the varying contours of the evenly distributed compaction force across the varying contrours of the workpiece workpiece surface. As such, the roller system applies an adjustable, evenly distributed compaction force across the varying contours of the workpiece surface. The use of pressurized gas in the housing provides support to the individual disks without axles or shafts as required by the prior art.

BRIEF DESCRIPTION OF THE DRAWINGS

FIG. 3 is a side view of the present invention taken along line 3—3 of FIG. 2;

FIG. 4 is a view of the present invention taken along 4—4 of FIG. 3;

FIG. 5 is an exploded view of a disk member and its corresponding support member which is a part of the present invention; and FIG. 6 is a representation of the present invention as it comes in contact with the workpiece.

DETAILED DESCRIPTION OF THE PREFERRED EMBODIMENT

Figure 1:
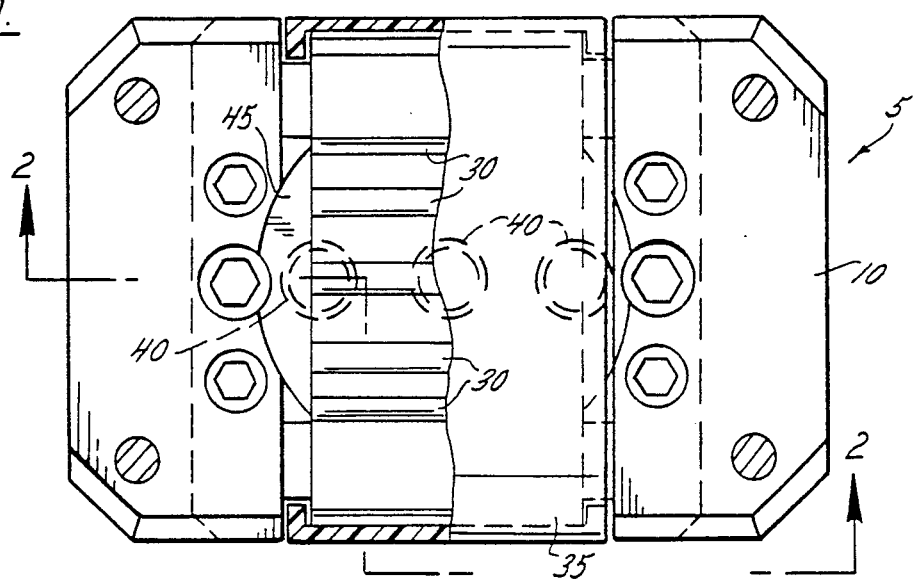
FIG. 1 is a top view of the present invention.
Figure 2:
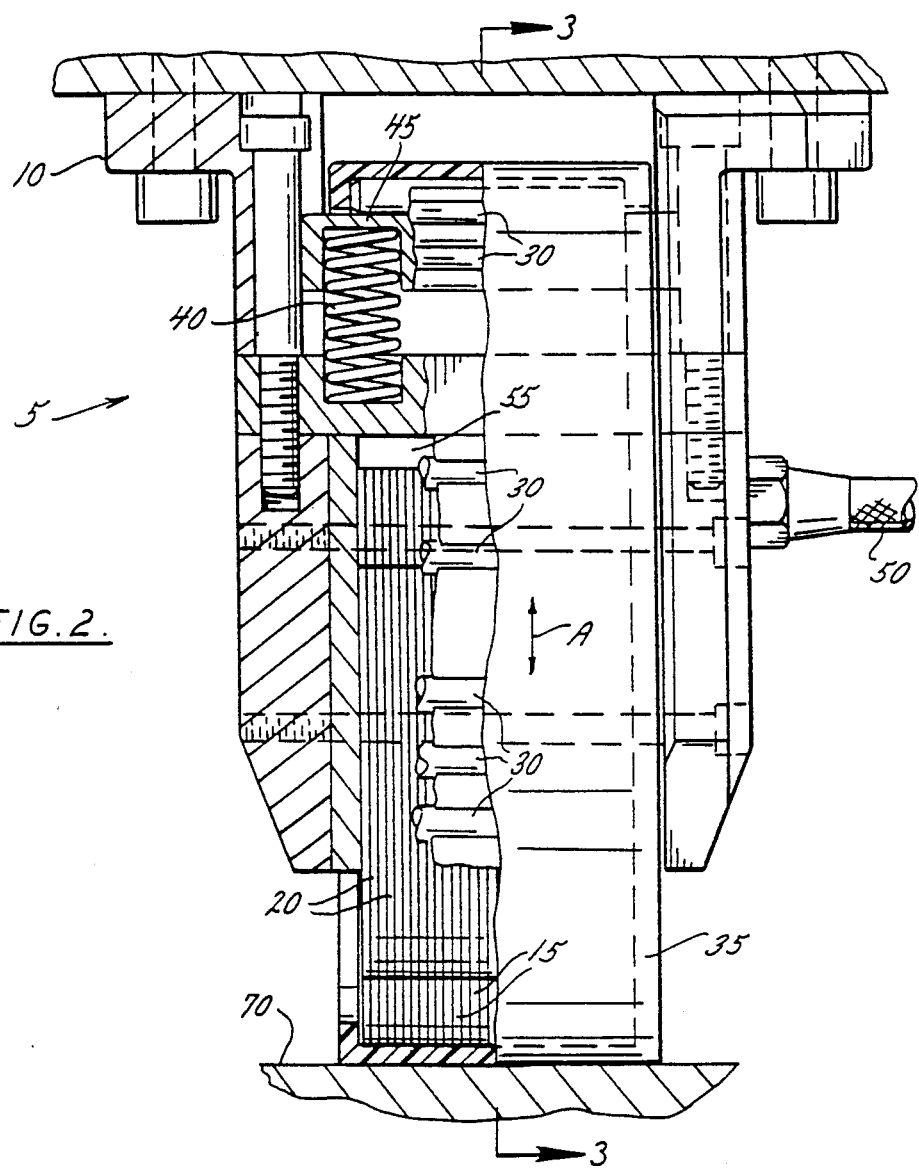
FIG. 2 is a side view of the present invention taken along 2—2 of FIG. 1.

Referring now to the drawings, and more particularly to FIGS. 2 and 3, there is shown a compaction device, generally designated 5, which incorporates the preferred embodiment of the present invention. Compaction device 5 includes a plurality of circular, comparatively thin disk members 15 which are made of a rigid material such as steel. Disk members 15 are divided into two sets, one set having a diameter 15a and the other set having diameter 15b.

As shown in FIGS. 3 and 5, each disk member 15 is independently and loosely supported within a corresponding support member 20. A first end of support member 20 is substantially concave in shape and includes sides 20a and 20b, while a second end of support member 20 is also substantially concave in shape and includes sides 20c and 20d which partially envelop the external peripheries of disk member 15. As a result of this arrangement, each disk member 15 can turn freely within, but cannot be separated or dislodged from, its corresponding support member 20.

Referring to FIGS. 2, 4, and 6, a plurality of individual disk members 15, in combination with their respective support members 20, are arranged alternately with respect to their diameters 15a and 15b in side-by-side arrangement within the lower portion of housing 10; alternating the diameters of the disk members 15 facilitates locational stability of the disk members and prevents their lateral movement. The plurality of disk members 15 are flanked on either side by end plates 25, each formed of a disk member 15 and a support member 20 which are fused together. Disk members 15, in combination with their support members 20, and end plates 25 are capable of independently sliding vertically in the direction of arrow A—A.

As shown in FIGS. 2 and 3, a plurality of roller shafts 30 are placed around the periphery of housing 10, and a high temperature silicone belt 35 is wrapped over roller shafts 30 and around housing 10 to distribute pressure evenly across the contact surface of workpiece 70. In the preferred embodiment of the present invention, an aluminized fiberglass strip is stitched and bonded to the outer portion of belt 35. A plurality of springs 40, each in combination with corresponding tensioners 45, are placed within the upper portion of housing 10 to keep belt 35 taut.

In operation, air pressure is applied from an external source through air hose 50 and into air chamber 55 so that when compaction device 5 is not in contact with workpiece 70, end plates 25 and the plurality of disk members 15 are pushed downward to form a substantially semi-cylindrical surface as they press against belt 35. As compaction device 5 is moved over the surface of workpiece 70, belt 35 rotates accordingly around housing 10 via roller shafts 30 and, as shown in FIG. 6, each disk member 15, in combination with its corresponding support member 20, and each end plate 25 are displaced vertically within housing 10 relative to the surface irregularity of workpiece 70 without influencing the position of adjacent disk members 15 or end plates 25. As a result of the pressure within air chamber 55, then, compaction device 5 applies a substantially even pressure across the entire contact surface of workpiece 70, even though the contour surface of workpiece 70 may be irregular.

Air in pressure chamber 55 internally cools compaction device 5. Furthermore, as air from pressurized chamber 55 bleeds between each of the disk members 15, friction between each of the disk members 15 is minimized. To further reduce friction, housing 10, disk members 15, support members 20, and end plates 25 are coated with a low friction coating such as Teflon, a registered trademark of E.I. Du Pont De Nemours & Company.

While the preferred embodiment of the present invention is particularly applicable to the compaction of composite materials, it may be used to equal advantage for the construction or laying-down of any material requiring a smooth and evenly supported surface. Accordingly, changes and modifications in the specifically described embodiment can be carried out without departing from the scope of this invention which is intended to be limited only by the scope of the appended claims.

What is claimed is:

1. A roller system for compacting the surface of a workpiece, comprising:
   (a) a housing having an air chamber;
   (b) pressure means for creating pressure within said air chamber;
   (c) compacting means, moveably engaged within said housing, for applying an adjustable pressure to the workpiece in response to said pressure means, wherein said compacting means comprises:
      (1) a plurality of disk members; and
      (2) for each said disk member, a corresponding support member having sides which partially envelop the external peripheries of said disk member such that said disk member does not dislodge from the corresponding support member, but wherein said disk member is rotatable within said support member,
   wherein each said disk member in combination with its corresponding support member is independently moveable within said housing, and
   wherein said disk members are positioned such that air from said air chamber bleeds between said disk members to internally cool said roller system.

2. The roller system as recited in claim 1, further comprising a belt wrapped about the periphery of said housing for distributing pressure evenly across the contact surface of the workpiece.

3. A roller system for compacting the surface of a workpiece, comprising:
   (a) a housing having an air chamber;
   (b) pressure means for creating pressure within said air chamber;
   (c) compacting means, moveably engaged within said housing, for applying an adjustable pressure to the workpiece in response to said pressure means, wherein said compacting means comprises:
      (1) a plurality of disk members; and
      (2) for each said disk member, a corresponding support member having sides which partially envelop the external peripheries of said disk member such that said disk member does not dislodge from the corresponding support member, but wherein said disk member is rotatable within said support member,
   wherein each said disk member in combination with its corresponding support member is independently moveable within said housing; and
   (d) a pair of end plates moveably mounted within said housing, wherein each said end plate is comprised of a disk member rigidly affixed to a support member.

4. A roller system for compacting the surface of a workpiece, comprising:
   (a) a housing having an air chamber;
   (b) pressure means for creating pressure within said air chamber; and
   (c) compacting means, moveably engaged within said housing, for applying an adjustable pressure to the workpiece in response to said pressure means, wherein said compacting means comprises:
      (1) a plurality of disk members; and
      (2) for each said disk member, a corresponding support member having sides which partially envelop the external peripheries of said disk member such that said disk member does not dislodge from the corresponding support member, but wherein said disk member is rotatable within said support member,
   wherein each said disk member in combination with its corresponding support member is independently moveable within said housing, and
   wherein said disk members are of alternating diameters to facilitate locational stability of said disk members and to prevent lateral movement of said disk members.

* * * * *